July 4, 1939.  M. PRÜSS ET AL  2,165,152
SEPARATING OF HEAVY MATERIALS FROM A STREAM OF LIQUID OF VARYING QUANTITY
Filed Dec. 17, 1935
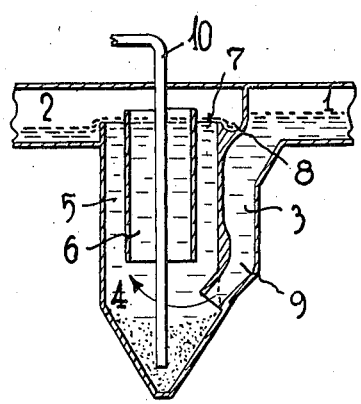
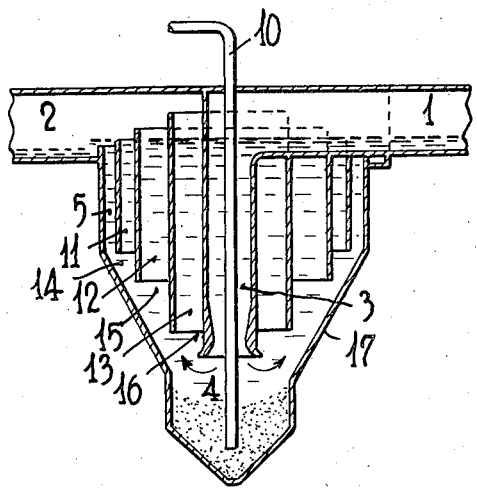
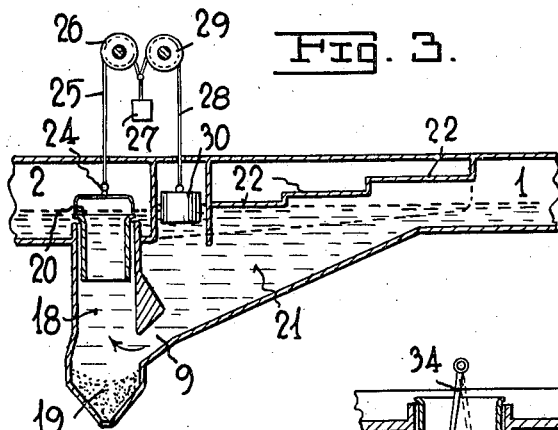
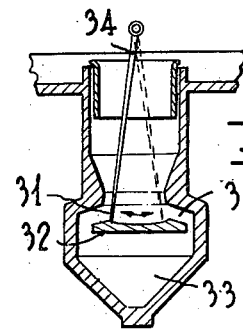
Inventor
Max Prüss,
Heinrich Blunk,
By Carl A. Hellmann,
Attorney Patented July 4, 1939

2,165,152

UNITED STATES PATENT OFFICE 2,165,152

SEPARATING OF HEAVY MATERIALS FROM A STREAM OF LIQUID OF VARYING QUANTITY

Max Prüss and Heinrich Blunk, Essen, Germany

Application December 17, 1935, Serial No. 54,956
In Germany December 21, 1934

4 Claims. (Cl. 209—158)

This invention relates to the separation of heavy materials from a stream of liquid of varying quantity, as is necessary, for example, in the wet dressing of ores and also in the treatment of waste waters. The heaviest constituents of a sludgy mixture can be separated from a stream of liquid by reducing the velocity of flow. This method, however, when employed with heavily fluctuating streams of liquid, has not hitherto been found to be reliable. For this purpose a separating apparatus through which a vertical stream of liquid flowed has been subdivided, as regards the cross sectional area of flow, by means of overflow weirs arranged at different heights, into a number of zones which came into operation in succession. With this apparatus, however, when the quantity of flow increases and the liquid then flows through a fresh zone, it is impossible to avoid the velocity with which the liquid rises in this zone being at first too small, so that lighter materials in addition to the heavy materials to be separated also sink to the bottom in this zone, which, however, must be avoided.

According now to the present invention, in separating apparatus in which the flow of liquid is vertical, a current of liquid is directed, preferably approximately horizontally, over the surface of the deposited material. The result is thereby obtained that any light solids which have been deposited together with the heavy solids to be separated at the bottom of the separator are again stirred up by the action of the pull or drag exerted by the horizontal stream of liquid and are washed upwards by this stream.

In order that the invention may be easily understood and carried into effect, the new method of separation and apparatus suitable for carrying it into effect will now be explained with the aid of the accompanying drawing, in which:

Figures 1 to 3 represent vertical longitudinal sections in the direction of flow of the liquid through separators of different sizes;

Figure 4 represents a vertical section transverse to the direction of flow of the liquid through a separator in accordance with Figure 3 provided with an auxiliary washing device.

Referring to the drawing, Figure 1 shows a form of construction which it is preferred to use for a small flow of liquid. The stream of liquid enters the separating apparatus from the channel or trough 1 and leaves it by the channel or trough 2. By means of a laterally disposed down pipe 3, the stream of liquid is conducted to near the bottom of the separating apparatus and is deflected in an approximately horizontal direction at the lower end of the pipe by a guide piece 9. Horizontal eddies are thus formed in the bottom part 4 of the separator by which the light solids deposited at the bottom of the apparatus are stirred up and are carried upwards into the part of the apparatus through which there is a vertical flow of liquid. The deflecting piece 9 must be designed as regards both its cross section and its angle of inclination in such a manner that the formation of eddies takes place in the manner desired. The upper part of the separating apparatus, in the form shown in Figure 1, is divided into two concentric spaces 5 and 6. The stream of liquid flows from the annular space 5 over the circular overflow edge or weir 7 into the channel 8 which leads to the discharge channel 2. The size of the annular section 5 is such that, when the flow of liquid in the channel 1 is the smallest which has to be taken into consideration, the vertical velocity with which the liquid rises in the zone or section 5 is just that which is necessary to effect the desired separation of the various solids. When the flow of liquid is greater than this minimum, the overflow weir on the partition between the spaces 5 and 6 comes into action, that is to say the liquid rises in the zone 6. The cross section of this zone is dimensioned in such a manner that, when the flow of liquid is a maximum, the velocity with which the liquid rises in the zone 6 is also just that which is necessary to effect the separation of the solids which are to be retained. Therefore, when the flow is intermediate between the maximum and minimum, the velocity with which the liquid rises in the zone 6 is too small, that is to say the lighter solids, the retention of which is not intended, are also deposited. This, however, does not matter in the new separating apparatus because these solids, as soon as they are deposited, are again stirred up by the properly directed horizontal current or eddies and are eventually carried into the outer zone 5 in which the current of liquid always rises with the velocity necessary for proper separation. The solids which are thus continuously washed clean and are finally deposited at the bottom of the separating apparatus are removed either from time to time or continuously by any suitable known form of apparatus, for example by an air siphon 10.

When the flow of liquid is greater, the simple form of separating apparatus illustrated in Figure 1 can no longer be employed. In this case the space in which the vertical stream of liquid rises must be more thoroughly divided, since otherwise, owing to the possibility of eddies being formed because of the chambers being too large, no uniform vertical flow will take place. Also, when the apparatus is large, the necessary clear guidance of the horizontal stream or eddy can no longer be obtained in the lower space 4 of the separator when the flow fluctuates. For use in such conditions, a preferred form of construction of the separator is shown in Figure 2. The vertical separating chamber through which the liquid flows is subdivided by a number of concentric rings into four annular compartments 5, 11, 12 and 13, which come into operation in succession as the flow of liquid increases owing to the overflow edges of these compartments being arranged at different heights. The distribution of the annular cross sections and the heights of the overflow edges are so arranged that the velocity with which the liquid rises in the zone 5 is always the correct velocity for washing the material. The stream of liquid to be treated is conducted to the separator through a down pipe 3 disposed in its central axis. The collecting chamber 4 for the solids to be separated is arranged so closely below the lower end of this down pipe that the stream of liquid which is horizontally deflected from the down pipe to the outermost annular zone 5 effects the above-described horizontal washing effect on the surface of the deposit.

In addition to this washing of the surface, a second characteristic feature of the invention is also employed in the separator according to Figure 2. It has already been stated that the portion of the stream of liquid which rises in the external annular zone 5 always has the vertical velocity which is necessary for proper washing, while in the remaining zones the velocity may at times be too small. In the separator according to Figure 2, however, provision is made whereby any light solids which may be separated with the heavier solids in the inner zones do not reach first the collecting chamber 4 to be washed out by the horizontal current of liquid. In this apparatus, on the contrary, they fall into that part of the stream of liquid which flows into the external annular zone. Owing to the fact that the lower edges 14, 15 and 16 of the partitions between the individual zones are carried downwardly to the vicinity of the conical bottom 17, the velocity of the stream of liquid flowing upwards over the bottom 17 is always such that the lighter solids are carried up with it to the actual separating zone 5. The separated solids are then removed from the separating chamber 4 in known manner.

When the quantity of liquid to be treated or the flow is very great, the separating apparatus shown in Figure 2 also is not satisfactory, because the diameter of the external washing zone 5 would then have to be so great that a uniform discharge of the liquid at the very long overflow edge or weir would no longer be possible or at least would require a very large fall. When such large quantities of water have to be treated, it is preferable to dispose the actual washing zone as an independent chamber beside the remaining zones, as is shown in the constructional example illustrated in Figure 3. In this figure 18 represents the washing zone with the collecting chamber 19 for the separated solids located immediately beneath it. When the flow of liquid to be treated is the minimum for the apparatus, the whole of the liquid which flows in through the channel 1 enters through the guide piece 9 into the bottom of the separator 18 and washes the surface of the solids deposited at the bottom 19 and rises with predetermined velocity in the chamber 19 and flows over the weir 20. Between the inlet 1 and the washing chamber 18 is interposed a chamber 21, the dimensions of which are such that, even when the flow is a maximum, the solids to be separated sink to the bottom in this chamber. In most cases lighter solids will sink with the heavier, which, as in the separator according to Figure 2, always fall into that portion of the stream of liquid which flows through the orifice 9 into the washing chamber 18. The liquid which does not reach the chamber 18 falls over the weirs 22, which are preferably arranged at different heights, and flows in channels 23 laterally around the zone 18 to the outlet channel 2.

In order always to maintain the velocity with which the liquid rises in the zone 18 constant, a uniform difference in level between the level of the liquid in the inlet channel 1 and that in the outlet channel 2 is necessary. If this cannot be effected, for example owing to the different formation of the channels 1 and 2, it is then advantageous to make the overflow pipe 20 of the zone 18 variable in height as shown in Figure 3.

If the flow of the liquid to be treated varies continuously, it is further desirable to make the height of the weir 20 automatically adjustable. Apparatus for this purpose is illustrated by way of example in Figure 3. The weir 20, the height of which can be varied, is connected by means of the screw 24, so that its height can be adjusted, with the rope 25 which passes over the guide pulley 26 and of which the other end is attached to a counterweight 27. A second rope 28 is attached to this counterweight and is passed over a guide pulley 29 to a float 30 which floats in the liquid which enters the chamber 21. By means of the screw 24, the fall in level between that of the inflowing liquid and the edge of the weir 20 is adjusted by hand to correspond to the quantity of liquid to be conducted through the chamber 18. If then a larger quantity of liquid flows into the inlet channel 1, with the result that the chamber 21 is filled to a correspondingly greater height, the float 30 is raised. The counterweight 27, therefore, is lowered and raises the edge of the weir 20 to the same extent. The chamber 18 has only been illustrated by way of example in Figure 3, and it may have any other suitable form provided that the mixture of solids of different specific gravities which is deposited sinks in the current of liquid which is conducted to the chamber 18. If the substances to be separated are particularly heavy, a small widening of the inlet channel 1 is sufficient in some circumstances for this separation.

If it is desired to make the collecting chamber 19 for the washed solids particularly large, provision must be made by a separate insertion for too light solids cannot be separated owing to incorrect eddying below the stream of liquid rising in the pipe 18 which would not be washed out again if the correct eddying did not take place.

In such cases, in order to ensure proper washing, an intermediate bottom must be interposed at the correct height relatively to the inflowing stream of liquid from which the washed materials are removed either continuously or at short intervals into a collecting chamber beside or beneath the intermediate bottom through which the current of liquid does not flow. An example of an apparatus of this kind is illustrated in Figure 4 in the form of an oscillating scraper 31 which acts on the bottom 32 on which the solids deposited are washed and by which the washing chamber 18 of Figure 3 is separated from the collecting chamber 33 disposed beneath it. The scraper 31 is moved by means of the rod 34 and pushes the solids through the passages 35 into the collecting chamber 33. Instead of the oscillating scraper, a revoluble scraper could also be employed or the washing bottom itself may be revolubly arranged.

We claim:

1. Apparatus for separating heavy substances from a stream of liquid having a variable total flow, which comprises a separator vessel, a plurality of vertical partitions dividing the vessel into a plurality of separate flow zones through which the liquid flows upwardly and an overflow weir for each flow zone, with the weirs of separate zones at different levels, said vessel having a portion for collecting the separated solids, said vessel having an inlet for the liquid to be treated, the lower end of said inlet being disposed so closely adjacent the surface of the said solids collected therein, that the stream of liquid emitted therefrom into the vessel initially flows immediately above the surface of the said deposited solids and in a dierction substantially parallel to said surface, the vessel having a feed channel supplying the stream to the inlet and an outlet channel for the treated liquid disposed at a level above the inlet channel whereby the difference of level of the liquid in inlet and outlet channels remains substantially constant despite variations of total flow, and whereby the flow in the zone having the lowest overflow weir will be maintained substantially uniform whenever the total flow of liquid through the vessel is sufficient to cause the corresponding weir to discharge.

2. Apparatus for separating heavy substances from a stream of liquid having a variable total flow, which comprises a separator vessel, a plurality of vertical partitions dividing the vessel into a plurality of separate flow zones through which the liquid flows upwardly and an overflow weir for each flow zone, with the weirs of separate zones at different levels, said vessel having a portion for collecting the separated solids, said vessel having an inlet for the liquid to be treated, the lower end of said inlet being disposed so closely adjacent the surface of the said solids collected therein, that the stream of liquid emitted therefrom into the vessel initially flows immediately above the surface of the said deposited solids and in a direction substantially parallel to said surface, the vessel having a feed channel supplying the stream to the inlet and an outlet channel for the treated liquid disposed at a level above the inlet channel whereby the difference of level of the liquid in inlet and outlet channels remains substantially constant despite variations of total flow, and whereby the flow in the zone having the lowest overflow weir will be maintained substantially uniform whenever the total flow of liquid through the vessel is sufficient to cause the corresponding weir to discharge, said zone being so disposed that the liquid entering it will flow below the entrances of the other zones.

3. Apparatus for separating heavy substances from a stream of liquid having a variable total flow, which comprises a separator vessel, a plurality of concentric vertical partitions including overflow weirs at successively higher levels for dividing said vessel into a plurality of separate concentric flow zones, the outermost zone having the lowest weir, said vessel having a portion for collecting the separated solids, said vessel having an inlet for the liquid to be treated, the lower end of said inlet being disposed so closely adjacent the surface of the said solids collected therein, that the stream of liquid emitted therefrom into the vessel initially flows immediately above the surface of the said deposited solids and in a direction substantially parallel to said surface, the vessel having a feed channel supplying the stream to the inlet and an outlet channel for the treated liquid disposed at a level above the inlet channel whereby the difference of level of the liquid in inlet and outlet channels remains substantially constant despite variations of total flow, and whereby the flow in the said outermost zone having the lowest overflow weir will be maintained substantially uniform whenever the total flow through the vessel is sufficient to cause the said weir to discharge.

4. Apparatus for separating heavy substances from a stream of liquid having a variable total flow, which comprises a separator vessel, a plurality of concentric vertical partitions including overflow weirs at successively higher levels for dividing said vessel into a plurality of separate concentric flow zones, the outermost zone having the lowest weir, said vessel having a portion for collecting the separated solids, said vessel having an inlet for the liquid to be treated, the lower end of said inlet being disposed so closely adjacent the surface of the said solids collected therein, that the stream of liquid emitted therefrom into the vessel initially flows immediately above the surface of the said deposited solids and in a direction substantially parallel to said surface, the vessel having a feed channel supplying the stream to the inlet and an outlet channel for the treated liquid disposed at a level above the inlet channel whereby the difference of level of the liquid in inlet and outlet channels remains substantially constant despite variations of total flow, and whereby the flow in the said outermost zone having the lowest overflow weir will be maintained substantially uniform whenever the total flow through the vessel is sufficient to cause the said weir to discharge, said zone being so disposed that the liquid entering it will flow below the entrances of the other zones.

MAX PRÜSS.
HEINRICH BLUNK.